United States Patent [19]
Schumann et al.

[11] Patent Number: 5,246,396
[45] Date of Patent: Sep. 21, 1993

[54] METHOD FOR THE HUMANE SLAUGHTER AND PROCESSING OF DOMESTICATED OSTRICH

[75] Inventors: Bobby R. Schumann, Elizabeth, Colo.; Harry M. Stickler, Wynnewood, Okla.; Douglas E. Stickler, Pauls Valley; Patricia J. Stickler; Harry B. Stickler, both of Wynnewood, Okla.

[73] Assignee: Royale Ostrich, Ltd., Wynnewood, Okla.

[21] Appl. No.: 713,467

[22] Filed: Jun. 10, 1991

[51] Int. Cl.$^5$ .................. A22C 21/00; A22B 3/00
[52] U.S. Cl. .......................... 452/52; 452/54; 452/58; 452/63; 452/67
[58] Field of Search ............ 452/52, 53, 177, 54, 452/187, 188, 57, 58, 63, 64, 67, 71, 106, 125, 131

[56] References Cited
U.S. PATENT DOCUMENTS

| | | | |
|---|---|---|---|
| 3,833,966 | 9/1974 | Harben, Jr. ................. | 452/63 |
| 4,097,960 | 7/1978 | Graham et al. .............. | 452/64 |
| 4,224,029 | 9/1923 | Heinz ........................ | 8/94.19 |
| 4,829,635 | 5/1989 | Tonnies ...................... | 452/52 |

OTHER PUBLICATIONS

K. J. Benfield, "Poultry in Motion: Breeder's Sell Shares in Ostrich Market", Cover story of The Wall Street Journal, Summer 1990 (?).
S. Lynn, "Rich Boas, Boots, and Golden Eggs", *Ultra Magazine*, Feb. 1991, pp. 69-70, 125.

*Primary Examiner*—Willis Little
*Attorney, Agent, or Firm*—Hopkins & Thomas

[57] ABSTRACT

A method is disclosed for the humane slaughter and efficient processing of ostrich. The method envisions transporting ostrich from station to station within a facility via a rail system. First, an ostrich is rendered unconscious by an electrical discharge to the head or neck region. The ostrich is hung in an inverted position on the rail system. The ostrich is then killed by lacerating the arteries in the neck and also the windpipe. The head is removed and useful parts are extracted. Next, the ostrich is de-feathered, and then skinned. The viscera is removed from the ostrich. The gizzard, heart, and liver are extracted for further processing. Finally, the edible meat products are removed from the ostrich and are processed for human use.

18 Claims, 13 Drawing Sheets

METHOD FOR THE HUMANE SLAUGHTER AND PROCESSING OF DOMESTICATED OSTRICH

BACKGROUND OF THE INVENTION

I. Field of the Invention

The present invention relates generally to the slaughtering of animals and, more particularly, to the humane slaughtering and processing of ostrich (*Struthio camelus*).

II. Background Art

Ostrich are large, two-toed, flightless birds indigenous to Africa and Arabia. Ostrich are the largest of living birds. Ostrich typically have heights of around 8 feet, lengths of about 6 feet, and weights of over 300 pounds.

Historically, ostrich have been slaughtered for their plumage, or feathers. However, in recent years, other ostrich body parts have been extensively used to better the standard of living of human beings. For example, ostrich eye lenses have been realized by scientists and medical researchers to be extraordinarily useful for transplant in humans. As a further example, ostrich hide, or skin, is now used for making purses, boots, and other forms of clothing. The public has responded favorably to the latter innovation. Consequently, a huge demand exists for the ostrich hide, which has become an expensive commodity.

In the conventional art, ostrich have been almost exclusively slaughtered and processed on the continent of Africa, where the birds originate. In the United States, the raising of ostrich for slaughter and processing is extremely limited. Usually, a farmer on a small family farm raises a few ostrich along with his other livestock.

Ostrich are large creatures and have volatile behaviors, making them burdensome to handle, slaughter, and process. Moreover, the processes known in the art are very crude. In Africa, the ostrich are usually slaughtered as follows. First, the ostrich is grasped about the head, and the ostrich is roped at the ankles. Next, the ostrich is hoisted into the air in an inverted position and its throat is cut. The blood is allowed to drain. Further, the hide is cut from the ostrich. Finally, the ostrich is gutted so that the meat can be cut from the animal. Hence, the methodology is crude and primitive.

In the United States, the current methodology for slaughtering the ostrich parallels the primitive approach taken on the African continent. Essentially, there is no known process in the world for large scale slaughtering and processing of ostrich. Moreover, in order to slaughter and process ostrich on a large scale for commercial gain in the United States, approval must be obtained by the United States Department of Agriculture (U.S.D.A.). In its history, the U.S.D.A. has never approved a slaughtering and processing technique for ostrich.

Needless to say, in utilizing the primitive slaughtering and processing methods, much of the ostrich is wasted, due to the crude procedures. For example, in order to properly remove many of the useful internal organs, such as the ostrich eye lenses, the organs must be carefully and methodically removed very soon after the ostrich is slaughtered and then refrigerated in some adequate fashion. In addition, the ostrich organs can contaminate each other during the slaughtering process, rendering many of them unfit for human use and consumption. For instance, fluids from the esophagus or gizzard can taint other organs, rendering them unfit.

Furthermore, conventional methods for the slaughter and processing of poultry (chickens, turkeys, ducks, geese, etc.) are not applicable to ostrich. Ostrich are extraordinarily larger, have volatile and violent behaviors, and possess different types of useful body parts, for example, skin and eye lenses, as compared with other poultry.

Thus, a need exists in the industry for a method of humanely slaughtering and processing ostrich in an efficient manner, on a large scale, and which meets U.S.D.A. approval.

SUMMARY OF THE INVENTION

The present invention provides a method for humanely slaughtering and efficiently processing ostrich in an efficient manner and on a large scale. First, an ostrich is rendered unconscious, and then killed. The ostrich head is removed for further processing. Next, the ostrich is de-feathered, and then is skinned. Further, the viscera is removed from the ostrich. Finally, the edible meat products are removed from the ostrich.

As a consequence of the present invention, ostrich are humanely killed and all of their body parts are put to some human use.

Further features and advantages of the present invention will become apparent to one skilled in the art upon examination of the following drawings and the Detailed Description section.

BRIEF DESCRIPTION OF THE DRAWINGS

The present invention, as defined in the claims, can be better understood with reference to the text and to the following drawings.

FIG. 3(A) shows a top view; FIG. 3(B) shows a side view; and FIG. 3(C) shows a side view with an ostrich positioned therein;

DETAILED DESCRIPTION OF THE PREFERRED EMBODIMENT

Figure 1:
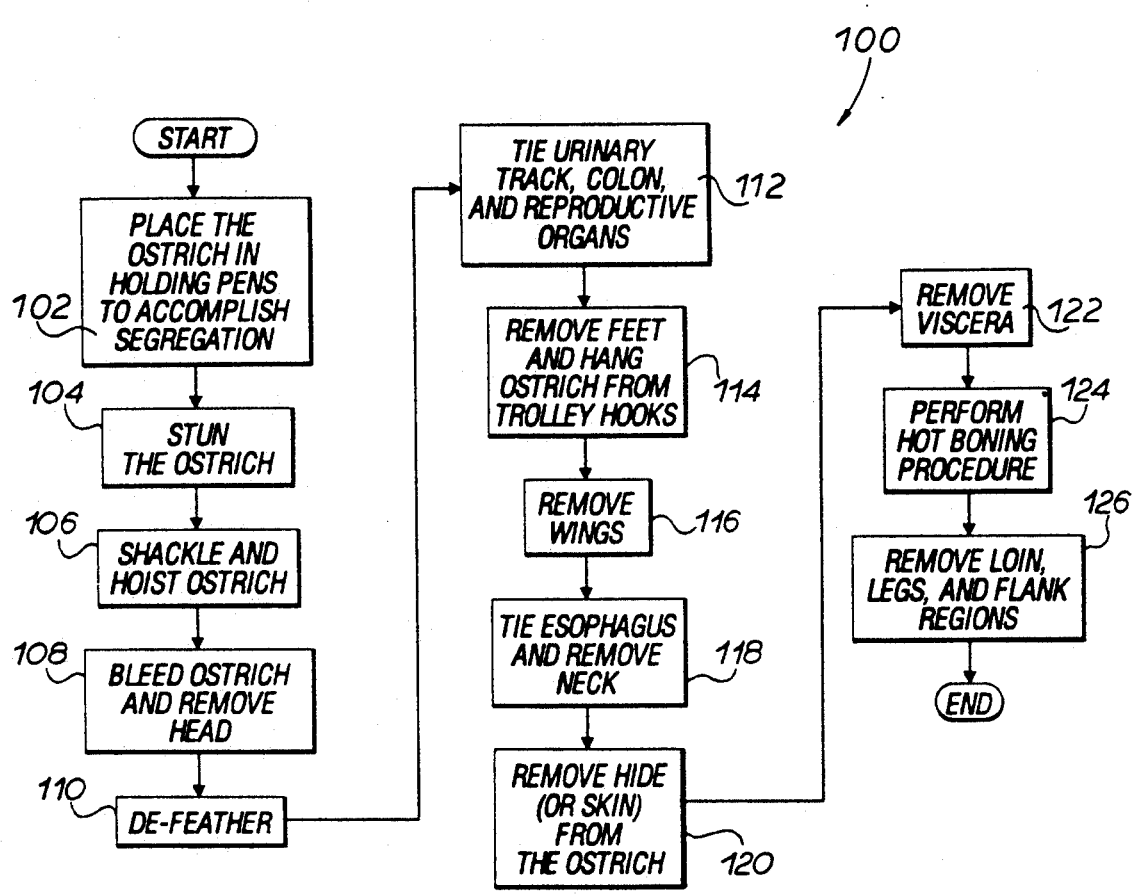
FIG. 1 illustrates the methodology of the present invention.
Figure 2:
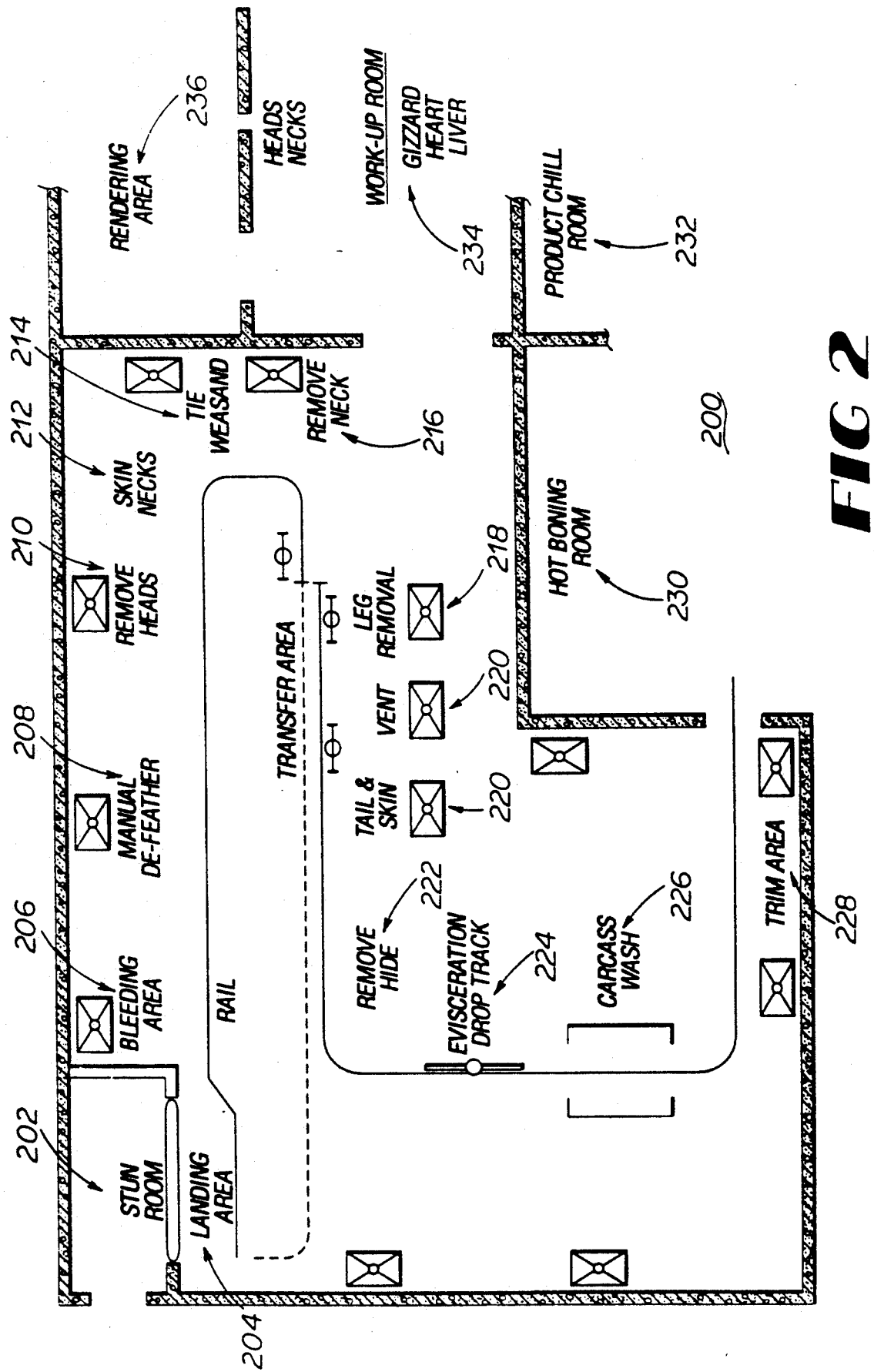
FIG. 2 shows an example of a facility for implementation of the present invention.

An overview of the methodology of the preferred embodiment is illustrated in FIG. 1. In accordance with the methodology, living ostrich are initially transported to an operational facility as shown in FIG. 2, where the ostrich are humanely slaughtered and efficiently processed. FIGS. 1 and 2 will be referred to hereinafter during the detailed discussion of the preferred embodiment. Worth noting is that in the document, the term "ostrich" means in a living or dead predicament, as well as in whole or in part.

The living ostrich are initially unloaded into a holding area (not shown). The ostrich remain in the holding area until a representative of the United States Department of Agriculture (U.S.D.A.) inspects the ostrich. The U.S.D.A. must inspect the ostrich prior to the initiation of the novel process.

The holding area comprises numerous holding pens. The ostrich are segregated by way of the holding pens, as prescribed in flowchart block 102 of FIG. 1. In other words, the holding pens are designed to hold only a few ostrich, such as two or three. Limiting the number of ostrich in each holding pen minimizes damage (bruises and the like) caused to the ostrich as a result of the enclosure itself and as a result of interaction with other ostrich, because ostrich tend to have volatile and violent behaviors.

Furthermore, ostrich often lie down, and it is difficult to move them due to their immense size. An escalator-like apparatus is envisioned for moving the ostrich through the facility if the lie down and cannot be provoked to move. Any conventional escalator apparatus which can handle the weight and control parameters with respect to the present invention may be utilized.

Each ostrich is individually herded into a restraining area recognized in the meat and poultry industries as a "knocking box" (or "stunning area"). The knocking box(es) is situated in the facility as shown at reference numeral 202 of FIG. 2. In the knocking box, ostrich are rendered unconscious so that they may be killed in a humane manner, in accordance with the Humane Slaughtering Act.

Figure 3A:
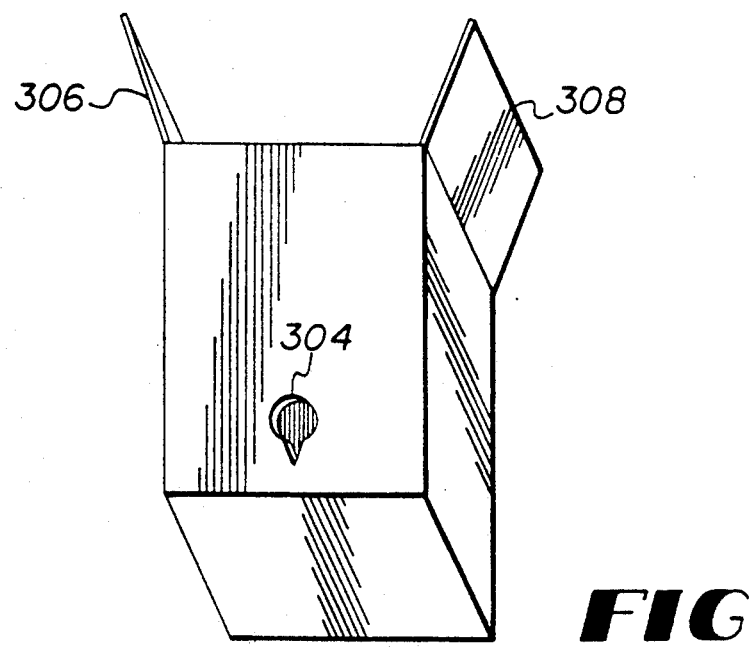
FIGS. 3(A)–3(C) illustrate various views of the knocking box in accordance with the present invention.
Figure 3B:
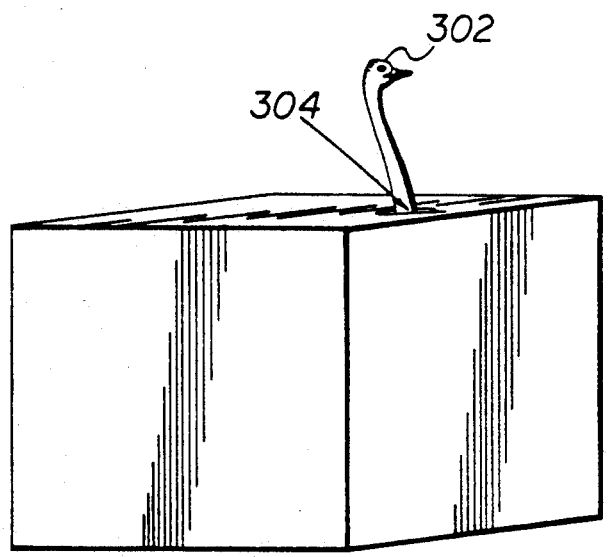
Figure 3C:
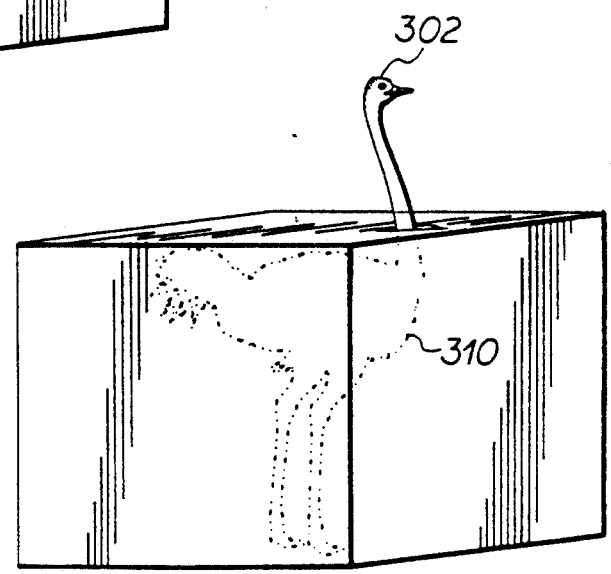

FIGS. 3(A)-3(C) illustrate in detail a knocking box in accordance with the present invention. FIG. 3(A) shows a top view of the knocking box. With reference to FIG. 3(A), the knocking box is designed to restrict the movement of the ostrich while permitting the ostrich to extend its head and neck region outside of the restraining area through a hole 304. The knocking box has doors 306 and 308 through which the ostrich enters. FIG. 3(B) illustrates a side view of the knocking box with an ostrich head 302 protruding through the hole 304. Finally, FIG. 3(C) shows the knocking box enclosing the ostrich body 310.

As approved by the U.S.D.A. and as shown in flowchart block 104 of FIG. 1, the head and neck region of the ostrich is given an electrical shock to stun the ostrich. A voltage and/or power range for stunning the ostrich is provided by the U.S.D.A. Using the U.S.D.A. approved shocking apparatus, such as an energized glove, stunning wand, or other mechanism, electricity charge is applied to the neck region and/or head 302 of the ostrich causing the ostrich to become stunned, but alive.

The ostrich are then rolled out of the knocking box into a landing area 204 of FIG. 2. To this end, a controllable door is situated at a side of the knocking box for dropping the ostrich into the landing area 204. The controllable door can be situated on any side of the knocking box or, perhaps, even on the bottom. If the controllable door is situated on a side, it is envisioned that the bottom may be slanted to aid in dropping the ostrich into the landing area 204.

Figures 4, 9:
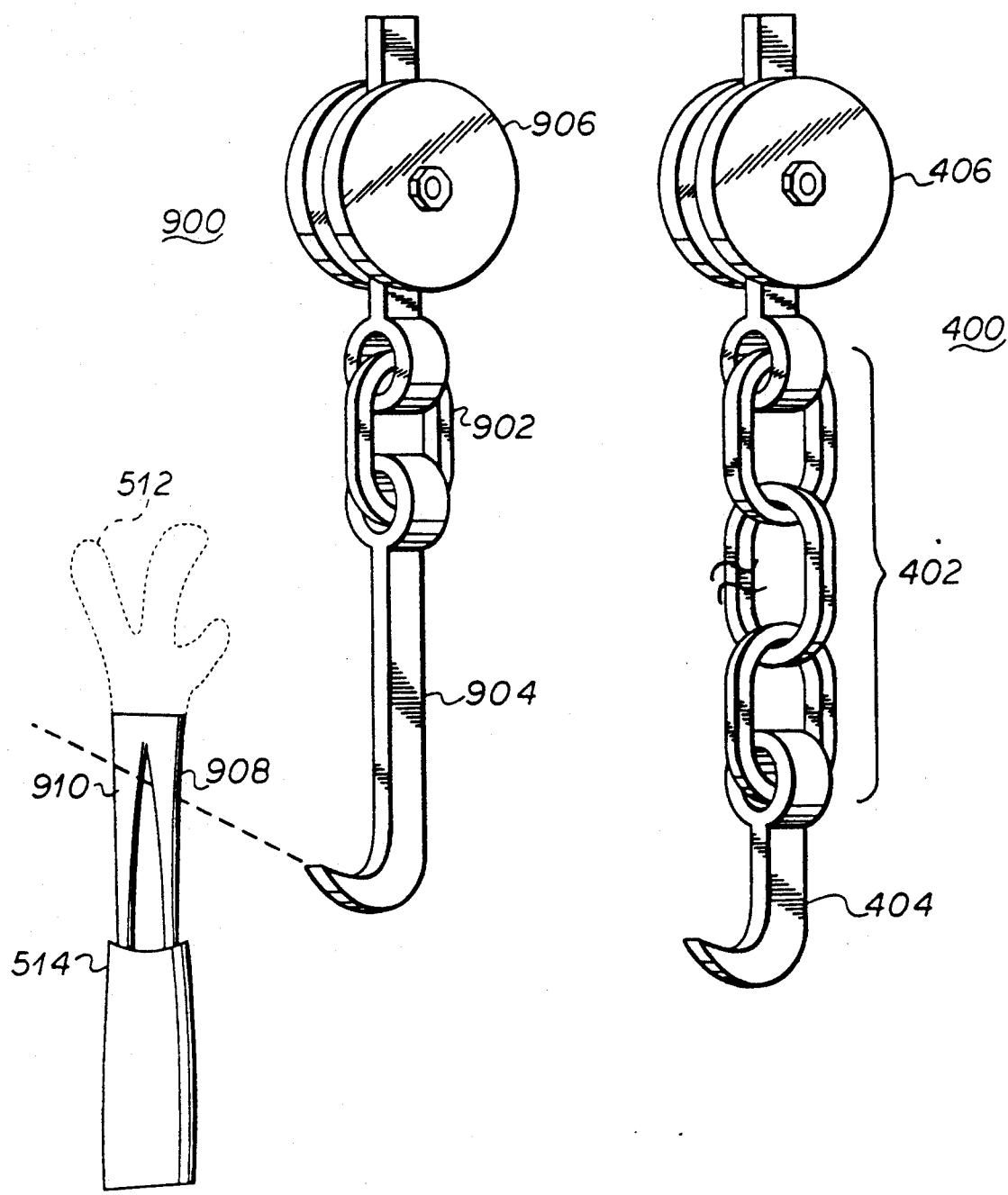
FIG. 4 illustrates a shackle for hanging an ostrich leg to a rail system of the present invention.
FIG. 9 shows a trolley hook for hanging an ostrich leg to the rail system.

In accordance with flowchart block 106 of FIG. 1, a chain, cable, or attachment mechanism is placed around one leg of the stunned ostrich, just above the foot. A "shackle" serving as the attachment mechanism in the preferred embodiment is shown in FIG. 4. The shackle comprises a chain 402 connecting a small end hook 404 at one end of the shackle and a rolling mechanism 406 at the other end.

Figure 5:
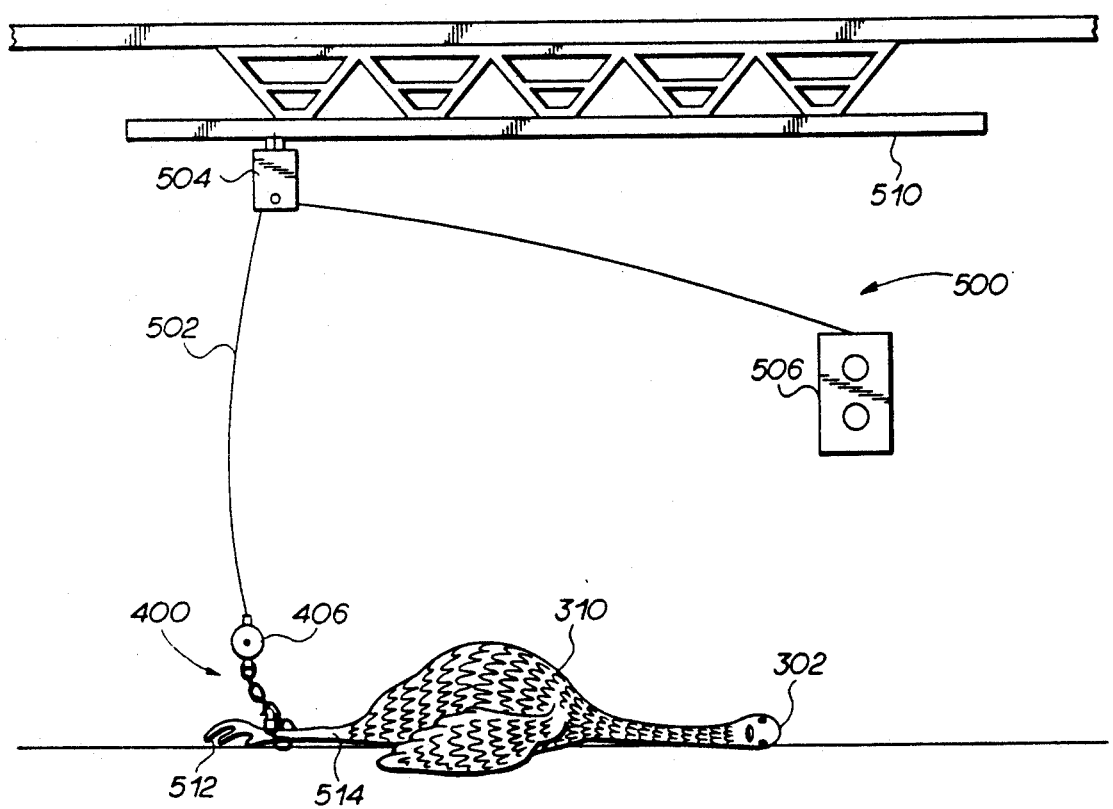
FIG. 5 shows a hoist apparatus for hoisting an ostrich having the shackle of FIG. 4 affixed to one leg of the ostrich and for placing the shackle upon the rail system.

As illustrated in FIG. 5, the shackle is placed on a hoist mechanism 502, 504, 506. The ostrich 310 is lifted from the floor and suspended by the shackle 400 in an inverted position. The rolling mechanism 406 on the shackle 400 will be placed upon a suspended rail system 510 at a designated height of approximately 15 feet to permit easy movement throughout the process and prevent contamination of the ostrich.

The suspended ostrich 310 is moved via the rail system 510 to a bleeding area 206, as indicated in FIG. 2, which is about 10-20 feet from the landing area 204. The bleeding area 206 is shown in greater detail in FIG. 6.

Figure 6:
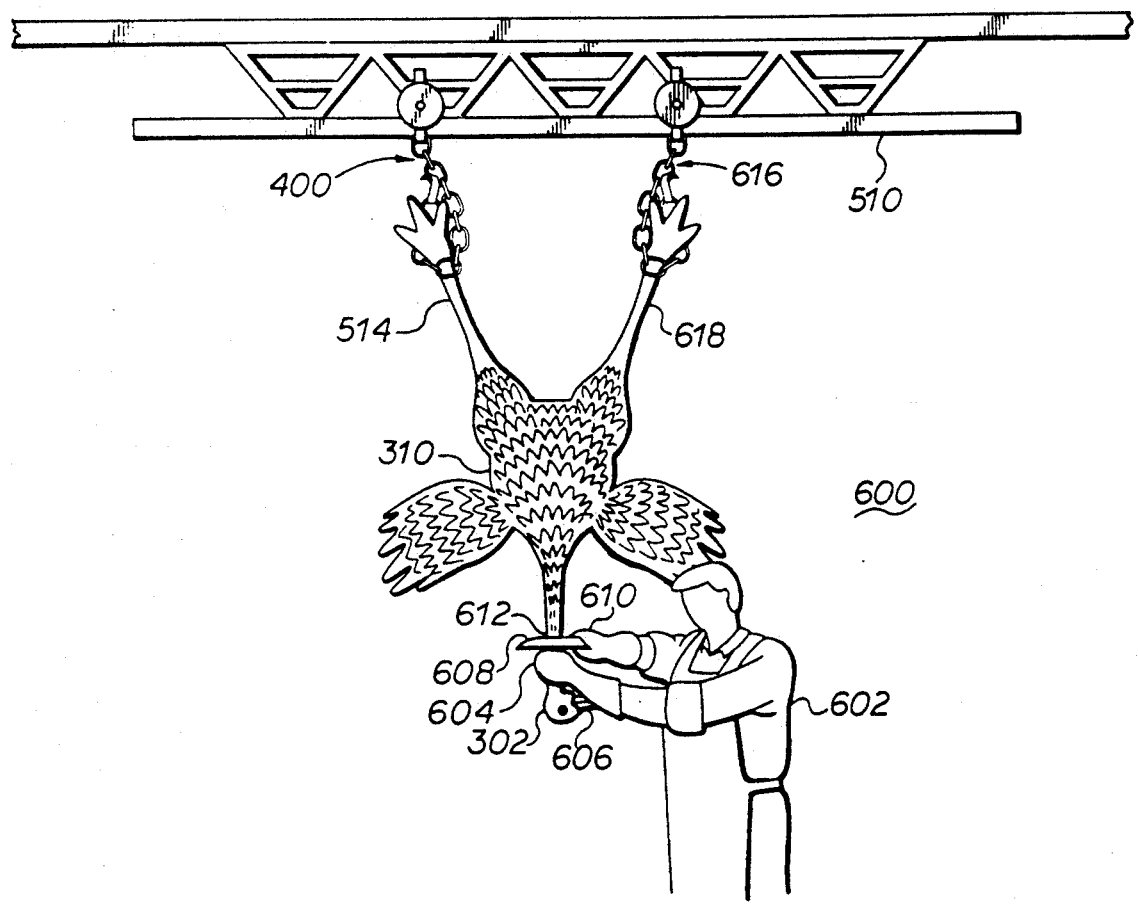
FIG. 6 illustrates the bleeding procedure in accordance with the present invention.

Referring to FIG. 6, a facility worker 602 uses one hand 604 to position the head 302 of the ostrich 310 by grasping the beak area 606 of the stunned ostrich 310. Utilizing a knife 608 in the other hand 610, the facility worker makes a 4-6 inch horizontal cut 612 across the arteries in the neck region and also across the windpipe permitting the ostrich 310 to be humanely killed.

The blood seeping from the ostrich 310 is collected for further processing into other products such as fertilizers, etc. The blood may be collected by using any conventional means, such as a container or gutter-like system positioned below the ostrich 310 during the bleeding process. Worth noting is that it takes approximately one to three minutes for all of the blood to drain from the ostrich.

While the ostrich 310 is in the bleeding area 206, another shackle 616 is affixed to the free leg 618 of the ostrich 310. The free leg is shackled in order to further stabilize the ostrich 310 for procedures which will be later performed. The second shackle 616 may be affixed to the ostrich 310 before or after the bleeding process.

After sufficiently bleeding the ostrich 310, the head 302 will be removed utilizing a large scissor-like apparatus or any other apparatus capable of severing the head 302. The head 302 will be transported from the bleeding area 206 to a work-up room 234, as shown in FIG. 2. From the head 302, several ostrich body parts will be removed for medical and pharmaceutical purposes. For example, the entire eye balls and associated appendages are removed. The lenses in the eye balls are of vital medical use as transplant lens in human beings. The eye balls along with their associated appendages are placed in an ice bath for proper preservation. After sufficiently reducing the body temperature of the eye balls and associated appendages, they are immediately packaged for shipment to an appropriate medical facility. Additionally, other portions of the head are removed and processed for medical, pharmaceutical, and other uses.

The remaining by-products of the head are transported to the rendering area 236, as shown in FIG. 2, for further processing as noted further hereinafter.

The beheaded ostrich 310 will continue to a "de-feathering area." A de-feathering area is illustrated at reference numeral 208 of FIG. 2. The de-feathering area 208 is meticulously isolated from the remainder of the facility so as to confine the feathers and not permit them to contaminate any of the other ongoing procedures taking place in the facility. In the preferred embodiment, the de-feathering area 208 is isolated by air curtains and/or physical barriers to prevent any feathers from contaminating the rest of the facility.

Figure 7:
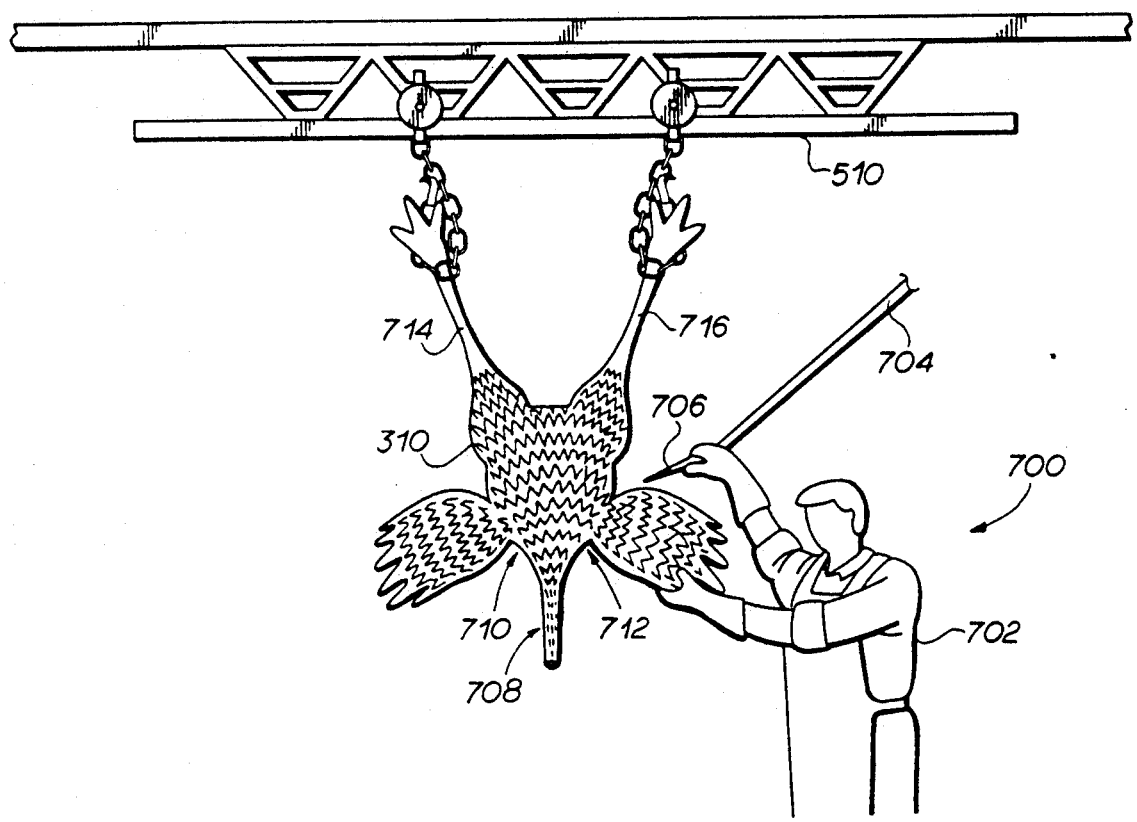
FIG. 7 illustrates the application of pressurized air during the de feathering procedure of the present invention.
Figure 8:
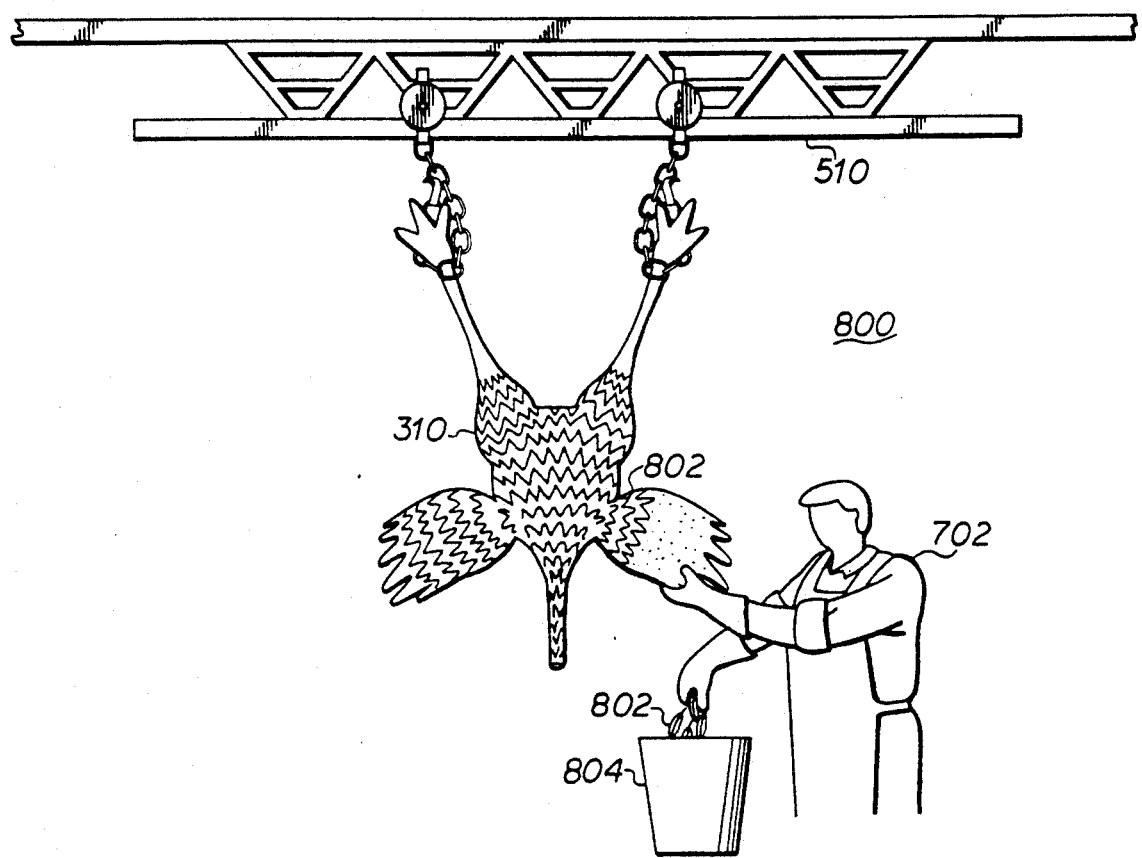
FIG. 8 illustrates the removal of feathers during the de-feathering procedure.

In the de-feathering area 208, as shown in FIG. 7, a facility worker 702 uses pressurized air apparatus to remove the feathers of the ostrich 310. The pressurized air apparatus comprises an air hose 704 for supplying pressurized air to a needle-like probe 706 of approximately six inches.

The needle-like probe 706 is inserted at various locations of the suspended ostrich 310 to effectuate proper de-feathering. The probe 706 is inserted into the base of the neck region at a position 708, as shown in FIG. 7. The probe 706 is also inserted into the base of the wing regions, as indicated by reference numerals 710 and 712. Finally, the probe 706 is inserted into the lower leg regions, just below the metatarsal joint, as indicated by reference numerals 714 and 716.

When the probe 706 is inserted at the previously mentioned locations, the probe 706 penetrates the hide area and rests on the outside of the individual muscle structures. Pressurized air at approximately 80–90 p.s.i. is applied to the probe 706 causing the area between the hide and the muscle structure to become inflated with the pressurized air. Such a predicament permits easy removal of the feathers.

While the hide area is inflated, the facility worker 702 manually removes the feathers 802 from the inverted ostrich 310. The feathers 802 are placed in a container 804, which is eventually sealed, for transport to another segregated, fully enclosed area of the facility for further processing, packaging, and shipment. The feathers 802 are a marketable product in the fashion and cosmetic industries.

The ostrich 310 on the rail system 510 from the isolated de-feathering area 208 to the next station in the facility. In this area, a facility worker holds the ostrich 310 with one hand and makes a circular cut around the "vent" opening (the tail end) utilizing a straight knife. The "vent" in this document refers collectively to the urinary track, the colon, and the reproductive organs of the ostrich 310. The facility worker next reaches into the ostrich 310 and grasp the colon, urinary track, and reproductive organs with one hand and pulls these organs approximately two to six inches from the ostrich 310. The foregoing organs will be tied utilizing string, rubber band, or other contricting device, in order to prevent contamination while undergoing further processing.

The facility worker now performs a procedure on each of the legs 514 and 618 of the ostrich 310. First, on one leg, for instance, the leg 514, the facility worker skins the hide area from the foot area to the thigh region utilizing a straight knife, thereby exposing the bones in the leg of the ostrich 310. The facility worker then removes the foot from the ostrich 310 utilizing a straight knife, scissor-like apparatus, or the like. After removal of the foot, the ostrich 310 will remain hanging from the rail system 510 via the other shackled leg 618. This is important because the ostrich 310 will be deemed contaminated if it touches the floor of the facility. The foot region is placed in a bin for transport to the rendering area 236.

The facility worker next acquires a trolley hook 900, shown in FIG. 9. As illustrated in the FIG. 9, the trolley hook 900 has a metal hook 904 which measures approximately 12" in vertical length adjoined to a roller mechanism 906 by a swivel mechanism 902. The roller mechanism 906 is designed to ride on the rail system 510. The metal hook 904 is placed between the connected bones 908 and 910 of the ostrich leg 514. The roller mechanism 906 of the trolley hook 900 is then placed on the rail system 510 to permit the ostrich 310 to be affixed to and move freely on the rail system 510 for the remainder of the novel procedure.

The facility worker repeats the foregoing foot-removal procedure on the leg 618. Consequently, at the end of this procedure, the ostrich 310 hangs from two trolley hooks 900, rather than from two shackles 400.

A facility worker next skins each leg region to the base of the thigh of the ostrich 310 utilizing a straight knife, powered skinning knife, or equivalent thereof. The facility worker removes both wings from the ostrich 310 utilizing a knife and places the wings in a bin for transport to the rendering area 236.

Figure 9A:
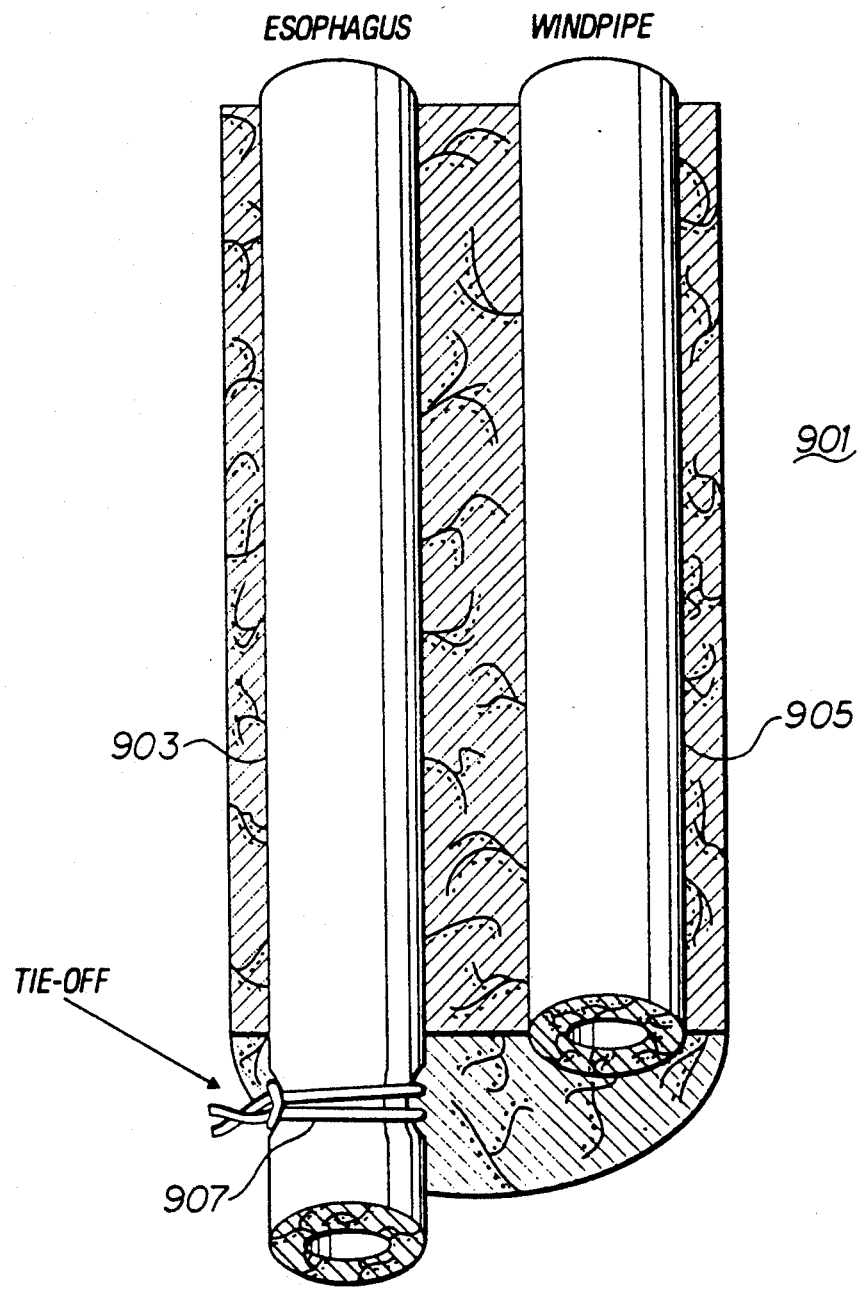
FIG. 9A shows a cut-away view of the neck region wherein the esophagus of an ostrich is tied off to inhibit contamination by fluids therein.

Via the rail system 510, the ostrich 310 is transported to a skin neck area in the facility, shown by reference numeral 212 in FIG. 2. In this area, a facility worker uses a knife to make a vertical cut along the entire length of the neck region to the base of the ostrich 310. FIG. 9A shows the neck region 901 after the incision has been made to thereby expose the esophagus 903 and the windpipe 905.

The ostrich 310 is next transported to an area 214 of FIG. 2. A facility worker strips, or separates, the esophagus 903 and also the windpipe 905 from the muscle tissue in the neck region 901. The esophagus 903 is pulled from the neck region 901 and tied at the end utilizing string, rubber band, or other constricting device, as indicated by reference numeral 907 in FIG. 9A. The windpipe 905 is permitted to remain functionally attached to the ostrich 310.

Further, at a facility area 216 of FIG. 2, the facility worker removes the neck region from the ostrich 310 using a knife, while permitting the esophagus 903 and windpipe 905 to remain attached to the Ostrich 310. The neck muscle from the removed neck region is placed by the facility worker upon a separate rack mechanism. The neck muscle is numbered with a correlating U.S.D.A. numbered tag to precisely identify each neck muscle with the corresponding ostrich 310. After final U.S.D.A. inspection of the neck muscle, the neck muscle will be transported to the another area for further processing.

Figure 10:
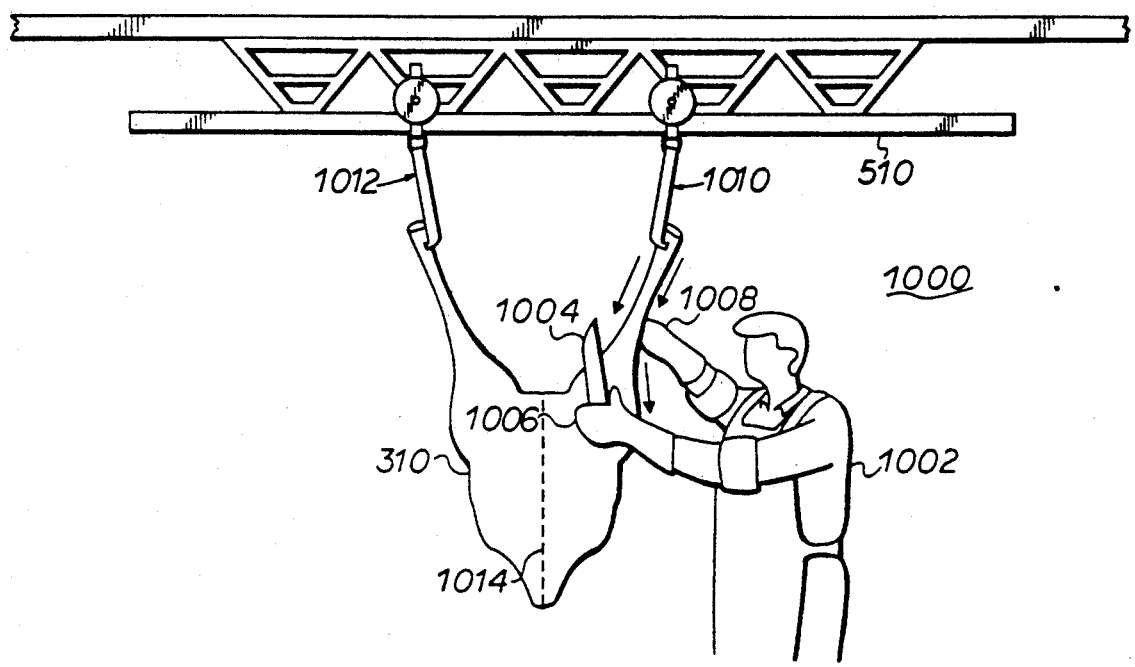
FIG. 10 shows the hide skinning procedure in accordance with the present invention.

The ostrich 310 is now transported to a facility area 222, shown in FIG. 2, where skinning takes place. The skinning procedure is noted at flowchart block 120 of FIG. 1 and is illustrated in greater detail in FIG. 10. Referring to FIG. 10, a facility worker 1002, utilizing a straight knife 1004, powered skinning knife, or equivalent thereof, skins the flank and back portions of the hide region from the ostrich 310. Skinning begins at the shank area (upper leg), as shown, and is continued downward on the ostrich 310 until reaching the bottom, where the neck region was located. "Skinning" in the context of this document means to place a knife between the hide and the muscle structure and remove the attached tissue in order to free the hide from the skeletal as well as muscular structure. As the facility worker 1002 is performing the skinning process with one hand 1006, the other hand 1008 is utilized to grasp and pull the hide away from the muscle structure.

Figure 11:
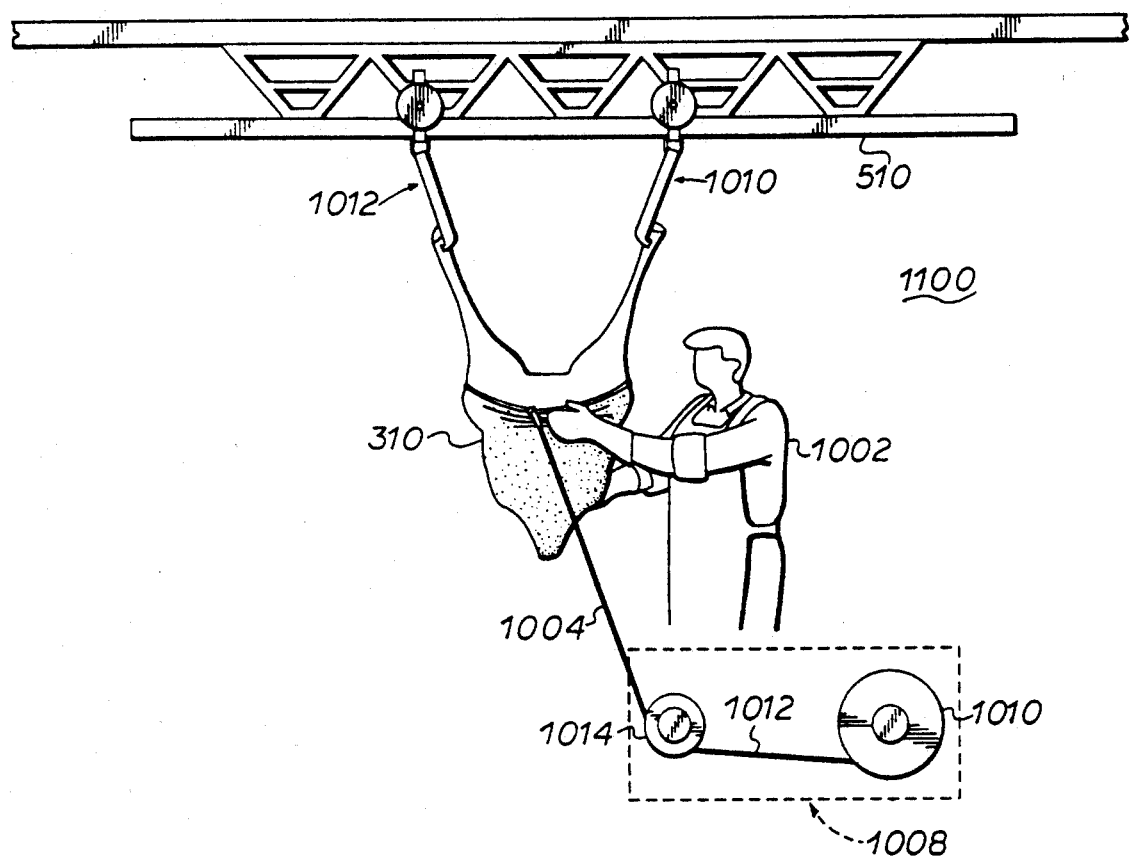
FIG. 11 illustrates the procedure for removing ostrich hide in accordance with the present invention.

After sufficiently freeing the hide from the ostrich 310, the facility worker 1002 loops one end of a chain 1004 around the freed portion of the hide, as illustrated in FIG. 11. The other end of the chain 1004 is attached to a pulling apparatus 1008 which is used to pull the remaining portion of the hide free from the ostrich 310 via a downward motion.

In the preferred embodiment, the pulling apparatus 1008 has a rotating axis 1010 for coiling a cable 1012 which is attached to the chain 1004 via a pulley 1014. The rotating axis can be driven by any conventional means, such as a motor or engine (not shown).

Once the hide is removed, the hide is transported to an area 220 of FIG. 2 for further processing.

Figure 12:
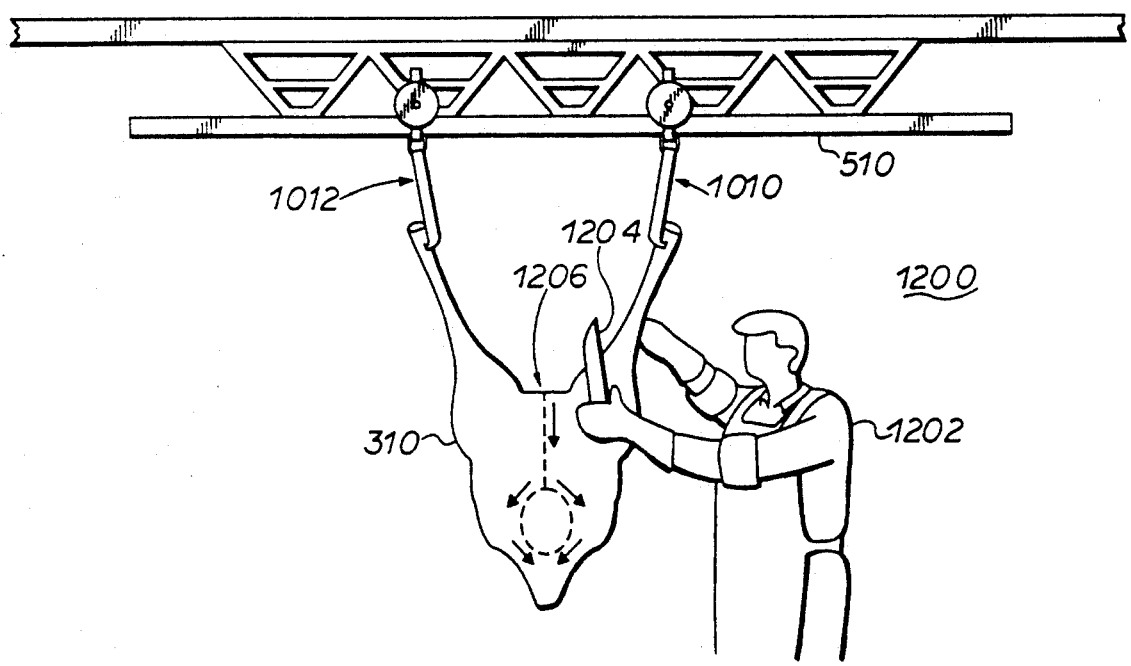
FIG. 12 illustrates the removal of viscera in accordance with the present invention.

The ostrich 310 is moved to the next facility area 224 of FIG. 2 via the rail system 510. At this facility area, the viscera of the ostrich is removed, as noted in the flowchart block 122 of FIG. 1. FIG. 12 illustrates the procedure in greater detail and is discussed below. "Viscera" in the context of this document means the internal organs within the abdominal cavity of the ostrich 310.

Referring to FIG. 12, a facility worker 1202 makes a vertical cut with a knife 1204 along the entire frontal region of the ostrich 310 The cut is made below the ostrich membrane (the layer below the skin) from the vent (anal) region to the breast plate, and then around the breast plate toward the neck region, as shown in FIG. 12. The cut exposes the viscera and permits easy removal by the facility worker 1202.

The facility worker 1202 pulls the gizzard from the viscera and ties a string, rubber band, or other similar device around the base of the gizzard. The facility worker 1202 next cuts the gizzard from the ostrich 310 utilizing a knife. The cut is made above the tie-off point to ensure that no fluids seep from the remaining orifice and contaminate remaining ostrich body parts. The gizzard is then removed. The gizzard is opened utilizing a knife and washed and cleaned according to U.S.D.A. specifications. The gizzard is transported to a chilling tank in the product chill room 232 of the facility, as shown in FIG. 2, in order to lower the gizzard's temperature and to further clean and prepare the gizzard for transportation. The gizzard is then packaged for shipment in the work-up room 234.

Furthermore, the facility worker cuts the tissue from around the heart region using a knife and removes the heart from the ostrich 310. The heart is opened in accordance with U.S.D.A. regulations, and is placed in a chilled bath in the product chill room 232 in order to lower the body temperature and clean the heart, and is packaged for shipment in the work-up room 234.

The facility worker also cuts the tissue from around the liver and removes the liver from the ostrich 310. Similarly to the gizzard and heart, the liver is opened in accordance to U.S.D.A. regulations, chilled, and packaged for shipment.

The remaining viscera, including the intestine area, is freed utilizing a knife and allowed to fall into a bin or other area to permit a complete and thorough inspection by the U.S.D.A. inspector. After inspection, the viscera is transported to the rendering area for further processing.

The ostrich 310 is now transported via rail system 510 to a final inspection area, where the U.S.D.A. inspector conduct a complete and thorough inspection of the ostrich. If the ostrich 310 is approved, then the ostrich 310 is transported via the rail system 510 to the hot boning room 230 of FIG. 2, in accordance with the flowchart block 124 of FIG. 1. However, if any bruises, fecal material, or other contamination within the specifications set forth by the U.S.D.A. are present on the ostrich 310, the U.S.D.A. inspector rejects the ostrich. The rejected ostrich is transported to a trimming area 228, shown in FIG. 2, for removal of the contamination and returned to the inspection area for re-inspection. If the ostrich 310 is then approved, the ostrich 310 continues to the hot boning room 230. If the ostrich 310 is again rejected by the U.S.D.A. inspector for pathological reasons, the ostrich 310 and the corresponding neck region will be transported to the rendering area 236 for further processing as an inedible product.

Figure 13A:
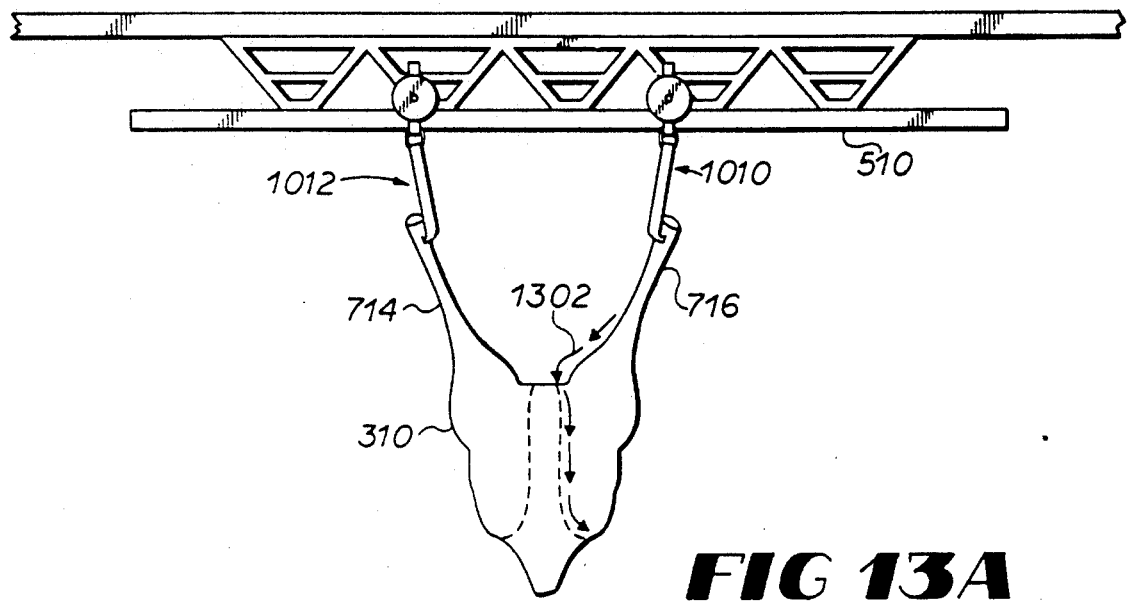
FIG. 13(A) and 13(B) show the incisions made on the front side and backside of an ostrich, respectively, during the hot boning procedure of the present invention.
Figure 13B:
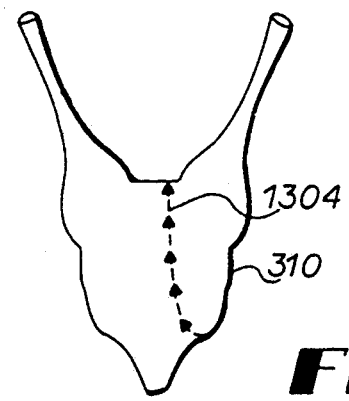

FIGS. 13(A) and 13(B) illustrate the hot boning procedure in accordance with the preferred embodiment of the present invention. Immediately after final inspection by the U.S.D.A. inspector and while the ostrich 310 continues to be suspended from the rail system 510, a facility worker using a knife makes a vertical downward cut, as shown by phantom line 1302 in FIG. 13(A), beginning at the top part of the loin region (inside leg) and through the hip joint. The facility worker continues to cut vertically down the ostrich 310, and then horizontally across the rib area to free the loin, flank, and leg muscle structures on the front section of the ostrich 310.

After completing the front section, the facility worker continues to cut in a vertical, upwards motion on the backside of the ostrich 310, as shown by reference numeral 1304 in FIG. 13(B). The cutting on the backside frees the flank, loin, and leg muscles from the back region of the ostrich 310. Upon completion of the foregoing cut, the loin, flank, and the leg 716 are completely freed from the ostrich 310. However, the loin, leg 716, and flank region remain attached to the rail system 510 via the trolley hook 1010. Moreover, the remainder of the ostrich 310 is still attached to the other leg 714 and remains suspended from the rail system 510 via the trolley hook 1012.

The foregoing procedure is repeated for the other leg 714. Upon completion, the remainder of the ostrich 310 is freed completely from the loin sections of both legs 714 and 716. The remainder falls into a bin or the like, and is transported to the rendering area for further processing.

At this point, the remaining leg muscle groups and loin muscle groups remain attached to the trolley hooks 1010 and 1012, and undergo a dipping or spraying process with water to remove all possible contaminates. The muscle groups are then transported via the rail system 510 to the product chill room 232, shown in FIG. 2, in order to reduce their temperature for a period of approximately 24 hours. The chilling area is maintained at a constant temperature between 30 and 45 degrees Fahrenheit, in accordance with U.S.D.A. regulations.

After chilling the muscle groups for approximately 24 hours, the muscle groups, which are still hanging from the rail system 510, are transported into a processing area. The muscle groups will be removed from the rail system 510 and placed on a table. A facility worker utilizing a knife cuts horizontally along the entire length of the leg muscle group, around the remaining skeletal structure, in order to remove the bones from the leg.

The muscle groups are then cut, sliced, and trimmed in accordance with the customer specifications and under the careful supervision of the U.S.D.A. The specific cuts of the muscle groups are packaged in a shrink wrap and placed in a heated area environment to seal the packaging material. In turn, the packages are placed in approved boxes for shipment to the consumers.

U.S.D.A. "approved" labels are affixed appropriately to the product box and the product box is placed in a cooled area awaiting shipment to the consumer via, truck, railroad, air, or other means of transport.

The hide of the ostrich which was removed as previously mentioned is transported to a separate area for further processing. A facility worker spreads each hide on a table exposing the entire dimensions of the hide. Salt is liberally applied over the entire side of the hide for preservative purposes. The hide is then folded or rolled and is tied with a cord or like device. The ostrich hides are stacked and shipped in this preserved form for further processing by a subcontracting company.

The by-products of this process which include the viscera, wings, feet, and other parts are transported to the inedible products area 236 shown in FIG. 2. In the inedible products area 236, these by-products are ground in a large, conventional grinding apparatus (not shown) and heated to a sufficient temperature to decontaminate the product. The product is then dried in a large drying apparatus (not shown) and transported for further processing into fertilizers and other non-edible commercial uses.

The foregoing description of the preferred embodiment of the present invention has been presented merely for purposes of illustration and description. It is not intended to be exhaustive or to limit the present invention to the precise form disclosed, and obviously many modifications and variations are possible in light of the above teachings. The particular embodiments were chosen and described in order to best explain the principles of the present invention and its practical application to those persons skilled in the art and to thereby enable those skilled in the art to best utilize the present invention in various embodiments and with various modifications as are suited to the particular use contemplated. It is intended that the scope of the present invention be broadly defined by the claims appended hereinafter.

We claim the following:

1. A method for humanely slaughtering and efficiently processing ostrich on a large scale in a facility, comprising the steps of:

stunning said ostrich via an electrical discharge;

hanging said ostrich in an inverted position by placing a first shackle around one leg of said ostrich, hoisting said ostrich to an inverted position, affixing said shackle to a rail system to permit mobility, placing a second shackle around the free leg of said ostrich, and affixing said second shackle to said rail system to enhance the stability of said ostrich hanging in said inverted position;

bleeding said ostrich by cutting the arteries in the neck region and the windpipe of said ostrich and permitting the blood of said ostrich to leave said ostrich;

decapitating said ostrich;

de-feathering said ostrich by isolating said ostrich via air curtains, providing a pressurized air dispenser having a needle-like probe, injecting air between the ostrich hide and the ostrich muscle structures by inserting said probe into the base of the neck region of said ostrich, into the base of both wing regions, and into both lower leg regions below the metatarsal joint, such that said probe penetrates said hide and rests at the outside of said muscle structures, and pulling said feathers from said hide;

tieing the colon, urinary track, and reproductive organs of the ostrich by making a circular cut around the vent opening of said ostrich, grasping the colon, urinary track, and reproductive organs, pulling said colon, urinary track, and reproductive organs approximately two to six inches from said ostrich, and affixing a constricting device around said organs;

removing the feet and wings from said ostrich;

removing the neck region of said ostrich by making a vertical cut along the length of the neck region of said ostrich, separating the esophagus and windpipe from the muscle tissue in said neck region, tieing said esophagus, while permitting said windpipe to remain functionally attached to said ostrich, and removing said neck region while permitting said esophagus and said windpipe to remain functionally attached to said ostrich;

skinning said ostrich;

removing the viscera from said ostrich by cutting vertically along the entire frontal region of the ostrich below the ostrich membrane from the anal region to the breast plate, around said breast plate, and to the neck region, said membrane being the layer below the ostrich hide, pulling said gizzard out from said ostrich, tieing said gizzard at the gizzard base, and cutting said gizzard above the tie off point to thereby separate said gizzard from said ostrich; and removing the edible meat products from said ostrich.

2. The method of claim 1, further comprising the steps of:

placing said ostrich in a restraining box for restricting movement of said ostrich, said restraining box having a hole;

extending the head and neck of said ostrich through said hole and outside of said restraining box;

applying an electrical shock to a region of said ostrich which is outside said restraining box to thereby stun said ostrich;

removing said ostrich from said restraining box; and hoisting said ostrich to said inverted position.

3. The method of claim 1, further comprising the steps of:

cutting the hide from the flank and back regions of said ostrich beginning at the loin region and working downward to the neck region; and pulling said hide away from said muscle structures.

4. The method of claim 1, further comprising the steps of:

(i) at the front of said ostrich at a first side, cutting vertically downward beginning at the top part of the loin region, through the hip joint, and then horizontally across the rib region;

(ii) at the back of said ostrich, cutting horizontally across said rib region, vertically upward through said hop joint, and to said top part of said loin region, thereby freeing said flank, loin, and leg muscles from a first leg of said ostrich; and (iii) repeating steps (i) and (ii) at the second side of said ostrich to thereby free said flank, loin, and leg muscles from a second leg.

5. The method of claim 1, further comprising the steps of:
grasping the beak area of said ostrich; and
cutting the neck region of said ostrich with a knife.

6. The method of claim 1, further comprising the steps of:
removing the eye balls from the head of said ostrich after decapitation;
placing said eye balls in an ice bath; and
after sufficiently reducing the temperature, packaging said eye balls.

7. The method of claim 1, further comprising the steps
cutting the hide on a first leg having said first shackle, the cut being from the foot region to the thigh region;
removing the foot from said first leg;
affixing a trolley hook between said first leg and said rail system;
cutting the hide on a second leg having said second shackle, the cut being from the foot region to the thigh region;
removing the foot from said second leg; and
affixing a trolley hook between said second leg and said rail system.

8. The method of claim 1, further comprising the steps of:
associating an identification tag with said neck region after removal, said identification tag identifying the ostrich from which said neck region was obtained;
permitting said neck region to remain dormant until final inspection of said ostrich; and
packaging said neck region for shipment if said final inspection is satisfactory.

9. The method of claim 1, further comprising the step of removing said heart.

10. The method of claim 1, further comprising the step of removing said liver.

11. The method of claim 1, wherein said first and second shackles comprise a chain connecting a small end hook and a rolling mechanism and wherein, when either said first shackle or said second shackle is affixed to said respective leg, said chain is wrapped about said respective leg and said small end hook is hooked to a chain link of said chain.

12. The method of claim 4, further comprising the steps of:
refrigerating said loin, leg, and flank;
removing the leg bone; and
cutting said loin, leg, and flank in accordance with the muscle groups.

13. The method of claim 4, further comprising the steps of:
skinning said first and second legs to the base of the corresponding thigh; and
removing both ostrich wing.

14. The method of claim 11, further comprising the step of lifting said ostrich by exerting upward force on said rolling mechanism of said first shackle.

15. The method of claim 1, comprising the steps of:
using a shackle to hoist and then suspend said ostrich, said shackle having a chain connecting a small end hook and a rolling mechanism;
wrapping said chain about said leg and hooking said small end hook on a link in said chain; and
lifting said ostrich by exerting upward force on said rolling mechanism.

16. A method for humanely slaughtering an ostrich, comprising the steps of:
placing said ostrich in a restraining box for restricting movement of said ostrich, said restraining box having a hole;
extending the head and neck of said ostrich through said hole and outside of said restraining box;
applying an electrical shock to either said head or said neck, or both, of said ostrich to thereby stun said ostrich;
removing said ostrich from said restraining box;
lifting said ostrich to an inverted position on a rail system for transporting said ostrich through processing areas; and
killing said ostrich while in said inverted position by making a cut across arteries in said neck and bleeding said ostrich.

17. The method of claim 16, further comprising the step of beheading said ostrich.

18. The method of claim 16, comprising the steps of:
using a shackle to lift and then suspend said ostrich, said shackle having a chain connecting a small end hook and a rolling mechanism;
wrapping said chain about said leg and hooking said small end hook on a link in said chain; and
lifting said ostrich by exerting upward force on said rolling mechanism.

* * * * *